US009796476B2

(12) United States Patent
Schmidt-Schaffer

(10) Patent No.: US 9,796,476 B2
(45) Date of Patent: Oct. 24, 2017

(54) SEAT ASSEMBLY, SEAT ARRANGEMENT AND PASSENGER CABIN FOR AN AIRCRAFT

(71) Applicant: Airbus Defence and Space GmbH, Ottobrunn (DE)

(72) Inventor: Tobias Schmidt-Schaffer, Munich (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 114 days.

(21) Appl. No.: 14/799,059

(22) Filed: Jul. 14, 2015

(65) Prior Publication Data
US 2016/0016667 A1    Jan. 21, 2016

(30) Foreign Application Priority Data

Jul. 15, 2014 (EP) .................................. 14177056

(51) Int. Cl.
*B64D 13/00* (2006.01)
*B64D 11/06* (2006.01)

(52) U.S. Cl.
CPC ...... *B64D 11/0641* (2014.12); *B64D 11/0601* (2014.12); *B64D 11/0606* (2014.12);
(Continued)

(58) Field of Classification Search
CPC ............ B64D 11/0601; B64D 11/0606; B64D 11/0627; B64D 11/0639; B64D 11/0641; B64D 11/0643
See application file for complete search history.

(56) References Cited

U.S. PATENT DOCUMENTS 6,059,364 A * 5/2000 Dryburgh ............. A47C 1/0352
                                                           105/322
7,665,693 B2 * 2/2010 Bettell .................. B64D 11/06
                                                           244/118.5
(Continued)

FOREIGN PATENT DOCUMENTS

CN       1132711 A       10/1996
CN       1628043 A        6/2005
(Continued)

OTHER PUBLICATIONS

European Search Report issued in corresponding European Application No. 14 17 7056, dated Dec. 11, 2014. (All references were previously submitted with an Information Disclosure Statement dated Jul. 14, 2015).
(Continued)

*Primary Examiner* — Philip J Bonzell
(74) *Attorney, Agent, or Firm* — Patent Portfolio Builders PLLC

(57) ABSTRACT

A passenger cabin of an aircraft includes a seat arrangement that includes a number of seat assemblies. The seat assemblies include a seat structure having a seat backrest forming a backrest surface the and a seat cushion element forming a seat surface, and a passenger space partition, which spatially partitions a passenger space of the seat and which at least partially surrounds the seat structure and leaves open an access to the seat structure. The seat cushion element is moveable between a comfort position, in which the seat cushion element projects further into the access in order to provide a larger seat surface, and an access position in which the seat cushion element does not project as far or does not project at all into the access in order to make possible a wider access.

9 Claims, 15 Drawing Sheets

Figure 1:
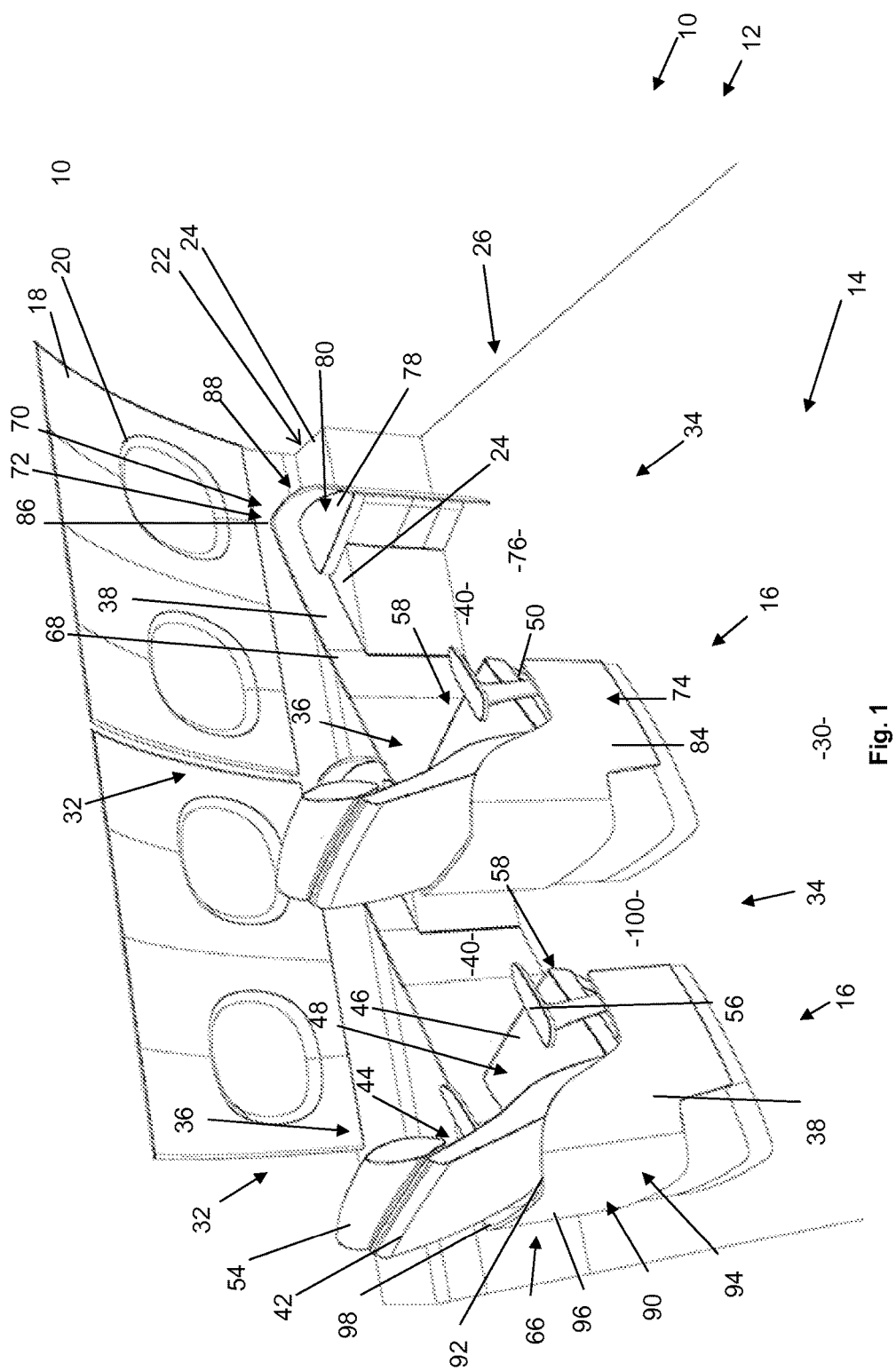

(52) U.S. Cl.
CPC ...... *B64D 11/0627* (2014.12); *B64D 11/0639* (2014.12); *B64D 11/0643* (2014.12)

(56) References Cited

U.S. PATENT DOCUMENTS

| | | | |
|---|---|---|---|
| 7,721,991 B2 | 5/2010 | Johnson | |
| 8,313,060 B2* | 11/2012 | Darbyshire | B64D 11/06 244/118.6 |
| 8,616,137 B2* | 12/2013 | Collins | B60N 3/002 108/137 |
| 8,622,345 B2* | 1/2014 | Collins | B64D 11/06 244/118.6 |
| 8,690,254 B2 | 4/2014 | Cailleteau | |
| 8,720,821 B2 | 5/2014 | Ferry et al. | |
| 8,768,311 B2 | 7/2014 | Beale et al. | |
| 9,004,599 B2* | 4/2015 | Collins | B64D 11/06 244/118.6 |
| 2007/0262625 A1* | 11/2007 | Dryburgh | A47C 1/0352 297/249 |
| 2008/0093502 A1* | 4/2008 | Bettell | B64D 11/06 244/118.5 |
| 2010/0065683 A1* | 3/2010 | Darbyshire | B64D 11/06 244/118.6 |
| 2010/0308164 A1 | 12/2010 | McKeever | |
| 2011/0101161 A1 | 5/2011 | Saint-Jalmes et al. | |
| 2011/0156450 A1* | 6/2011 | Collins | B60N 3/002 297/135 |
| 2011/0186682 A1* | 8/2011 | Collins | B64D 11/06 244/118.6 |
| 2011/0210204 A1* | 9/2011 | Collins | B64D 11/06 244/118.6 |
| 2012/0292957 A1 | 11/2012 | Vergnaud et al. | |
| 2013/0043345 A1 | 2/2013 | Ferry et al. | |
| 2013/0106156 A1* | 5/2013 | Orson | B64D 11/06 297/217.3 |
| 2014/0300152 A1* | 10/2014 | Park | B64D 11/06 297/232 |
| 2015/0175266 A1 | 6/2015 | Ferry et al. | |

FOREIGN PATENT DOCUMENTS

| | | |
|---|---|---|
| CN | 101010237 A | 8/2007 |
| CN | 101925514 A | 12/2010 |
| CN | 102753436 A | 10/2012 |
| EP | 1 211 176 A1 | 6/2002 |
| EP | 2 219 944 B1 | 4/2013 |
| GB | 2 454 751 A | 5/2009 |
| WO | 2009077717 A2 | 6/2009 |
| WO | 2014/087387 A2 | 6/2014 |

OTHER PUBLICATIONS

Office Action in Chinese Application No. 201510412833.3 dated Nov. 18, 2016. (References WO201408387A2 and GB2454751A were submitted with an Information Disclosure Statement dated Jul. 14, 2015).

* cited by examiner

SEAT ASSEMBLY, SEAT ARRANGEMENT AND PASSENGER CABIN FOR AN AIRCRAFT

CROSS-REFERENCE TO RELATED APPLICATIONS

This application claims priority under 35 U.S.C. §119 to European Application 14177056.0, filed Jul. 15, 2014, the entire disclosure of which is expressly incorporated by reference.

BACKGROUND AND SUMMARY OF THE INVENTION

Exemplary embodiments of the invention relate to a seat assembly for providing at least one seat of a seat arrangement for a passenger cabin of an aircraft. The seat assembly includes at least one seat structure having a seat backrest forming a backrest surface and a seat cushion element forming a seat surface, and a passenger space partition, which is designed for spatially partitioning a passenger space of the seat and which at least partially surrounds the seat structure and leaves open an access to the seat structure. Furthermore, exemplary embodiments of the invention relate to a seat arrangement for a passenger cabin of an aircraft, the seat arrangement includes a plurality of such seat assemblies. Finally, exemplary embodiments of the invention relate to a passenger cabin of an aircraft, in particular an airplane, the passenger cabin comprising such a seat assembly and/or such a seat arrangement.

Exemplary embodiments of the invention are particularly directed to the construction and arrangement of comfortable seats in airplane cabins, and even more particularly with the optimization and/or maximization of the number of business class seats in airplane cabins of long range airplanes, the business class seats allowing not only sitting but also lying while at the same time meeting the certification requirements and the geometric boundary conditions. In particular, the seats are designed to provide a single seat having a flat sleeping surface in the lying or reclining position, which can be easily used by as many passengers as possible. For example, a sleeping surface should have an elongation of about 195 cm or larger in at least one dimension. Furthermore, the exemplary embodiments provide a seat that is as comfortable as possible and has a seat width of approximately 20 inches (approximately 51 cm).

In particular, direct aisle access to each individual seat should be possible; the passenger should be able to reach the seat without having to have the other passengers get up.

An arrangement of passenger seats in an airplane passenger cabin is known from the EP 1 211 176 B1, which discloses a seat assembly, a seat arrangement as well as a passenger cabin. As in the case of the present invention, EP 1 211 176 B1 is directed to providing a seat assembly, a seat arrangement as well as a passenger cabin, where it is possible to achieve optimal utilization of the cabin with a limited space availability, and where each passenger is provided with adequate space for free movement and a private area so that a high degree of comfort and contentment, in particular, during long distance flights is achieved.

The following documents also disclose seat assemblies, seat arrangements, and passenger cabins: U.S. Pat. Nos. 8,768,311 B2, 8,690,254 B2, 8,720,821 B2, US 2013/0043345 A1 and U.S. Pat. No. 7,721,991 B2.

Existing seat assemblies, seat arrangements, and passenger cabins for the business class of long-range airplanes do not provide very efficient space utilization, so that fewer seats exhibiting the properties desired for the business class seats are made available on the same area.

Exemplary embodiments of the present invention are directed to a seat assembly, a seat arrangement, which can be formed with the seat assembly, as well as a passenger cabin, which is provided with the arrangement, and to be able to provide with the seat assembly more seats with free accessibility to each seat in less space.

Exemplary embodiments of the invention provide, according to a first aspect, a seat assembly for forming at least one seat of a seat arrangement for a passenger cabin of an aircraft, in particular, an airplane, the seat assembly comprising at least one seat structure that has a seat backrest forming a backrest surface and a seat cushion element forming a seat surface, and a passenger space partition, which is designed for spatially partitioning a passenger space of the seat and which at least partially surrounds the seat structure and leaves open an access to the seat structure, wherein the seat cushion element can be moved between a comfort position, in which the seat cushion element projects further into the access, in order to provide a larger seat surface, and an access position, in which the seat cushion element does not project as far or does not project at all into the access, in order to make a wider access possible.

Preferably the seat cushion element can be moved horizontally under the seat backrest, in order to move from the comfort position into the access position.

Preferably the seat cushion element can be designed movably in such a way to provide a seat surface having a variable depth.

Preferably the seat cushion element can be moved, when seen or projected in the horizontal direction, between the comfort position and the access position by approximately 7 cm to approximately 26 cm.

Preferably the seat structure has a foot and/or leg support element, which has a foot and/or leg rest surface and which can be moved between a position of use and an access position.

Preferably the foot and/or leg support element can be folded relative to the seat cushion element in such a way that the foot and/or leg rest surface forms an elongation of the seat surface in the position of use.

Preferably the seat backrest can be moved between an upright position and a reclining position.

Preferably, in a reclining position of the seat assembly, the backrest surface and the seat surface together form at least one portion of an essentially horizontal sleeping surface, when the seat structure has been moved into the reclining position.

Preferably, in a reclining position of the seat assembly, the seat backrest extends into a space that is occupied by the seat cushion element in the access position.

Preferably the seat structure can be moved into a reclining position, in which the backrest surface, the seat surface and a foot and/or leg rest surface, which is formed at a foot and/or leg support element, form an essentially flat or planar sleeping surface.

Preferably in the reclining position the foot and/or leg support element rests on a storage space delimitation.

Preferably the passenger space partition has a storage space with a storage space delimitation, which can be used in the reclining position, in order to support a foot and/or leg support surface.

Preferably, in the reclining position, the seat assembly provides a sleeping surface, which has a length of at least 180 cm to 210 cm, preferably approximately 195 cm, in at least one direction.

Preferably the passenger space partition has a cutout and/or a bulge, in order to make it possible to move the seat cushion element into the reclining position.

Preferably, in a plan view, the seat assembly has a tear-shaped and/or essentially parallelogram-like outer contour, preferably with a narrower foot end region and a wider rear end region, which surrounds the seat structure in the access or comfort position.

Preferably the seat assembly has an asymmetrical outer contour relative to a longitudinal center plane.

Preferably, in the plan view, the passenger space partition has a front projection at the foot end region; and this projection forms the front end of the passenger space partition and is arranged so as to be offset towards one side relative to a longitudinal center plane.

Preferably the front projection is arranged so as to be offset towards a side, having no access, relative to the longitudinal center plane.

Preferably, between the front end and the access, the passenger space partition has, when seen in the plan view, a bevel, which extends to the rear and to the side, and/or an arch-shaped shoulder that extends to the rear and to the side.

Preferably the passenger space partition has, when viewed in the plan view, a projection on the rear end region; and this projection forms the rearward end of the passenger space partition and is arranged so as to be offset towards one side relative to a longitudinal center plane.

Preferably the rearward end is arranged so as to be offset towards a side having an access.

Preferably the passenger space partition has a forward extending bevel and/or a forward extending arch-like shoulder from the rearward end towards the center and towards a side having no access.

Preferably a storage compartment or storage container for providing a storage space that can be used personally by the passenger using the seat assembly can be housed in a foot end region.

According to an additional aspect, exemplary embodiments of the invention provide a seat arrangement for a passenger cabin of an aircraft, the seat arrangement comprising a plurality of seat assemblies according to one or more of the embodiments described above.

Preferably, in at least some of the seat assemblies, an access path to the access leads past a front end and/or a rearward end of a respective adjacent seat assembly and/or is defined thereby.

Preferably rows of laterally adjacent seat assemblies are arranged so as to be offset from each other in such a way that an access spacing distance, which opens out into the access of a laterally adjacent seat assembly, is formed between a front end of a seat assembly, following in a row, and a rearward end of a seat assembly, located in the row in front of the former row, for the purpose of providing one's own access path from a longitudinal aisle to the seat of the laterally adjacent seat assembly.

Preferably a space is formed between at least two seat assemblies as the storage space.

Preferably the seat assemblies of the lateral outer rows are arranged so as to be tilted with their foot end regions towards the outside.

Preferably the seat assemblies of a first and a second adjacent center row are tilted in each case towards the other of the first and the second center row.

Preferably the foot end regions of adjacent seat assemblies overlap, when seen in the plan view.

Preferably at least one rear end region of a first seat assembly projects, when seen in the plan view, into an access of a passenger space partition of an adjacent second seat assembly so as to overlap the outer contour of the same.

According to an additional aspect, exemplary embodiments of the invention provide a passenger cabin of an aircraft, the passenger cabin comprising a seat arrangement, according to one or more of the embodiments described above, and/or at least one or more of the seat assemblies, according to one or more of the embodiments described above.

According to preferred embodiments of the invention, a seat arrangement, i.e., layout, and a matching seat, i.e., the seat assembly, with a displaceable seat surface and optimized dimensions are provided. Preferably the seat surface can be moved under the backrest. The dimensions are copied preferably from a footprint.

A seat surface, which is pushed under the backrest, enables convenient access to each seat, even if the seat assemblies are very close to each other. Preferably access is provided laterally directly in front of an anchoring of a seat structure, so that in a comfort position a seat cushion element, which makes the seat surface available, can be pushed completely forward and at the same can easily block or impede the entire access or a major portion of the access.

In an access position the seat surface is adjusted to be smaller in the (horizontal) depth preferably by pushing the seat cushion element under the backrest. Preferably in the access position it is still possible to sit on a seat surface that has been reduced in depth; and it is possible to achieve easy access by means of a lateral access in a passenger space partition.

With such a seat assembly it is possible to achieve optimized utilization of the space in a passenger cabin by placing a plurality of such seat assemblies side-by-side in a row in a wide range of arrangements. Adjacent seats can also project with their front end or their rearward end partially into a lateral opening of the passenger space partition and leave open a corresponding access.

Preferably a variable seat surface is provided by means of a seat cushion element that can be displaced, in particular, in the horizontal direction. In particular, the depth of the seat is variable.

Preferably the seat surface can be pushed under the backrest for an access position. A displacement can take place, for example, by 5 inches (approximately 13 cm).

Preferably in the reclining state a seat structure provides a flat sleeping surface. A storage space on a side wall (for example, a storage space provided on a side wall of the cabin) can be housed under a portion of the sleeping surface that has been provided in the reclining position by this technique.

The sleeping surface is at least approximately 195 cm long in at least one dimension, in particular, measured at or in a diagonal.

The seat assembly, in particular, a passenger space partition of the same, has preferably an asymmetrical shape (at least when seen in the plan view) with a sloped or downwards curved foot end. The corresponding bevel or bend or curvature makes it possible to access a seat of another adjacent seat assembly, where in this case the seat is located, when seen from the aisle region, on the opposite side next to this seat assembly.

According to preferred embodiments, preferably two particularly preferred kinds of arrangements may be considered for the seat arrangement. In the case of a first seat arrangement, which is referred to hereinafter as the standard layout, a seat assembly, which is arranged closer to the side wall and which is a part of an outer row, which is to be assigned laterally to a side wall of the passenger cabin, is tilted, when seen in the plan view, with the head position away from the side edge at a first angle of, for example, 5 deg. to 10 deg., in particular, 8.2 deg., with respect to the longitudinal direction of the passenger cabin (corresponds to the direction of flight). In the reclining position the feet are aligned more towards the side wall and rest, for example, on a side wall storage space. A seat assembly, which is laterally adjacent thereto and which is a part of a lateral aisle seat row, which is arranged between the outer row and the first aisle, is arranged so as to be tilted preferably at a smaller angle in the other direction relative to the direction of flight, so that the foot region is aligned somewhat closer to the aisle, and the head position is aligned somewhat closer to the side wall. As a result, the seat structure with the head position can occupy the place that is made available by the side slope in the outside row; and the seat assemblies can be placed closer together with a high degree of comfort.

In the preferred standard layout, the center rows, which are arranged in a center region of the passenger cabin, are arranged preferably parallel in the direction of flight.

In a second preferred embodiment of the seat arrangement, which is referred to hereinafter as a herringbone layout, an angular position of the outside seat assemblies, which are arranged closer to the side wall of the passenger cabin, for example, at 20 deg. to 40 deg., in particular, 28.4 deg., is provided in such a way that the head region is arranged away from the side wall; and the foot is arranged more towards the side wall. With such an angular position the seat assemblies can be arranged closely side by side and one behind the other in the manner of a herringbone pattern and, in so doing, can occupy an optimal space. In the center region the adjacent seats are arranged in the shape of a V, so that the feet are tilted towards the center. Here overlappings of the foot regions can be provided.

The front ends and the rearward ends of the seat assemblies, which are formed preferably by means of the passenger space partition, are provided preferably with laterally offset ends having bevels, in order to enable access to the adjacent offset seat.

Preferably a variable seat surface is provided in such a way that the depth of the seat is variable. Preferably the seat surface can be pushed under the backrest. For example, a displacement in the horizontal direction by 7 inches (approximately 18 cm) is possible. A displacement range between 3 inches and 10 inches may be useful (between approximately 7.5 cm and approximately 26 cm). This displacement range can be determined according to the respective layout.

In an access position the seat surface can be pushed preferably under the backrest, in order to facilitate access to the seat. Depending on the layout, access of at least 5 inches or more is specified, just as in the economy class.

When the access position is changed to a comfort position, the seat surface is moved forward. Preferably the seat surface is then no longer under the backrest, but rather is extended completely out of the region underneath the backrest as far as in front of the backrest. Comfortable sitting at a corresponding seat depth has been made possible.

Also possible is preferably a sleeping position. In this case the backrest folds preferably rearwards and uses the space that was previously needed underneath the backrest. The seat surface is pushed forward. A leg support, which may eventually be present, folds upwards. Together with a foot element a completely flat sleeping surface is produced.

The foot element can rest on a side wall storage space and, as a result, can use the space in an ideal way. The side wall storage space does not impede the seat.

The seat, which is made available by means of the seat assembly, has an asymmetrical shape; a curvature on the back side makes access possible.

Preferably a space above the foot region and between the seats can be used, depending on the layout, as the storage space.

The complete sleeping surface has preferably a length of 195 cm in the diagonal.

Advantages of the preferred layouts are explained in the following.

The displaceable seat surface makes it possible to implement "denser" layouts with, nevertheless, direct access to each seat.

An overlapping of the seats in the region of the foot support is possible.

A cutout or a bulge can be provided in the passenger space partition, which is formed, for example, by a seat cover, in order to make it possible to move the seat surface into a sleep position.

In a preferred standard layout preferably two types of seats or seat rows are provided. The seats of seat row A are rotated in the direction of flight (approximately 5 deg. to 10 deg.), where in this case the head position is tilted away from the side wall and the foot region is tilted in the direction of the side wall storage space (if present).

The seats B are slightly rotated in the direction of A (in particular, in the opposite direction; preferably approximately 2 deg. to 5 deg.), in order to gain more space.

In airplanes with a steeper side wall the seats may not have to be rotated as much, in order to enlarge the width of an aisle.

The center seats can be slightly rotated relative to each other in the direction of flight, in order to gain more space.

In a preferred herringbone layout, the lateral seats have an angular position (for example, 28.4 deg., angular positions in the range of 20 deg. to 35 deg, are possible, depending on the layout), so that a head element is offset towards the aisle; and a foot element is tilted towards the window underneath the curved side wall. In the case of the seat arrangement, proposed in the US 2013/0043345 A1, access is possible only coming from the foot region; in the preferred embodiment of the invention the situation is different. A displacement of the seat surface enables access with orientation of the seats in the direction of the window view; this feature makes it possible to provide a larger private sphere. The passengers can sit tilted away from the aisle and can sit with their backs to the aisle.

The center seats can also be arranged with their foot region tilted towards the center and with their head region towards the aisle; this feature is not possible with the arrangement disclosed in US 2013/0043345 A1, where access must occur from the foot region. In the preferred arrangement according to the invention, a slight overlapping in the foot region is also possible.

One possible mechanical structure (other solutions are also possible) provides that a seat cushion element or more specifically a seat surface is moved by means of a rail in the side cover in the horizontal direction from the access position to the comfort position. A roller carriage can be provided. The roller carriage is moved in the horizontal direction from the comfort position to the reclining position, in order to move and support the seat surface with the leg support from the comfort position to the reclining position. An inclination of the seat surface can be adjusted by means of a vertical rail.

A leg support, which is hinged to the seat cushion element, can be swung up from below by means of hydraulic cylinders.

The mechanism can be covered, preferably completely.

BRIEF DESCRIPTION OF THE DRAWING FIGURES

The invention is explained in detail below with reference to the accompanying drawings. The drawings show in FIG. 1 a perspective view of a side wall region of one embodiment of a passenger cabin of an aircraft, such as, in particular, an airplane, with a first embodiment of a seat arrangement composed of a plurality of seat assemblies, which are arranged diagonally one behind the other (herringbone layout) in an access position, where in this case a first embodiment of the seat assembly is shown.

Figure 2:
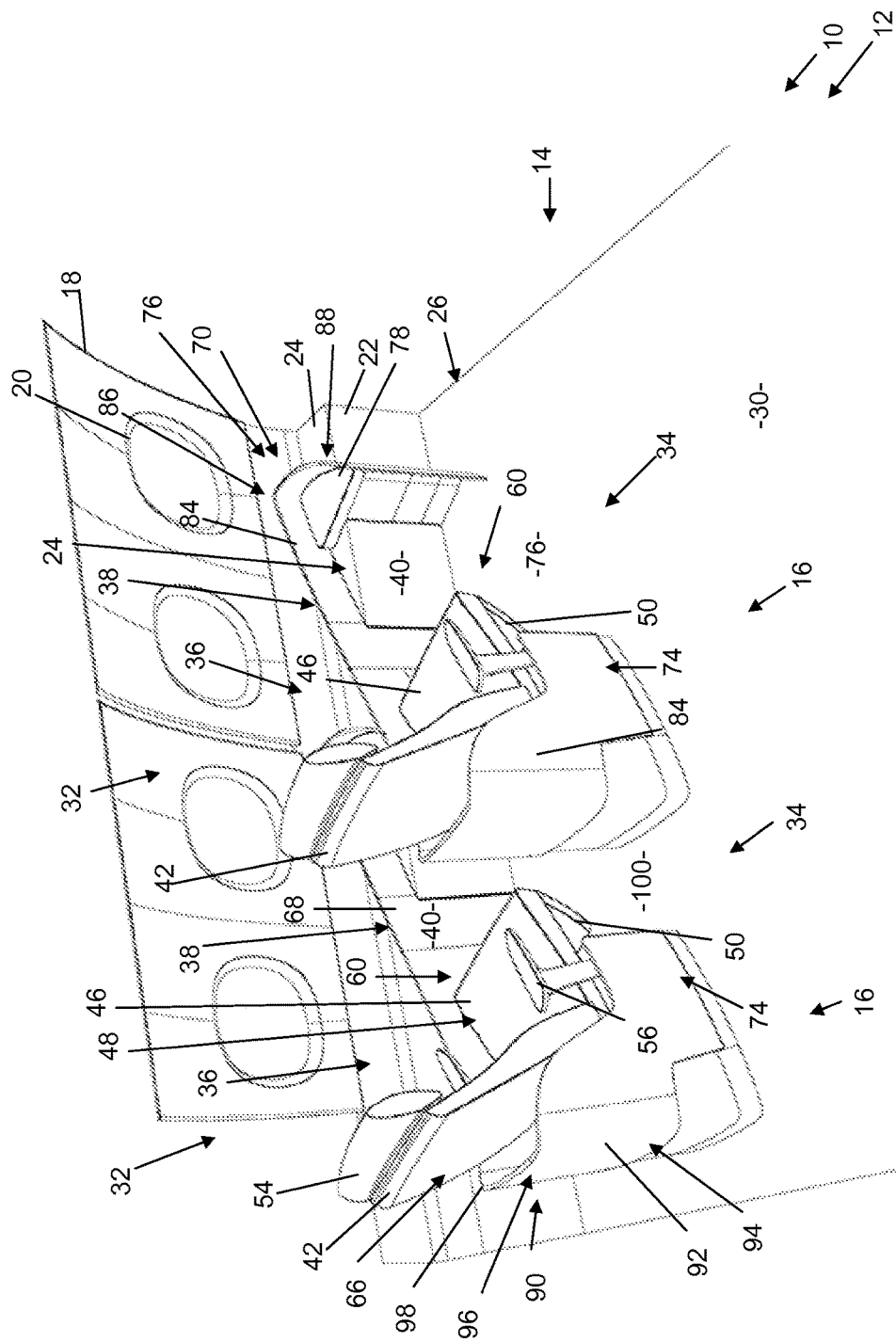

FIG. 2 a representation comparable to FIG. 1, where in this case the seat structures of the seat assemblies are in a comfort position.

Figure 3:
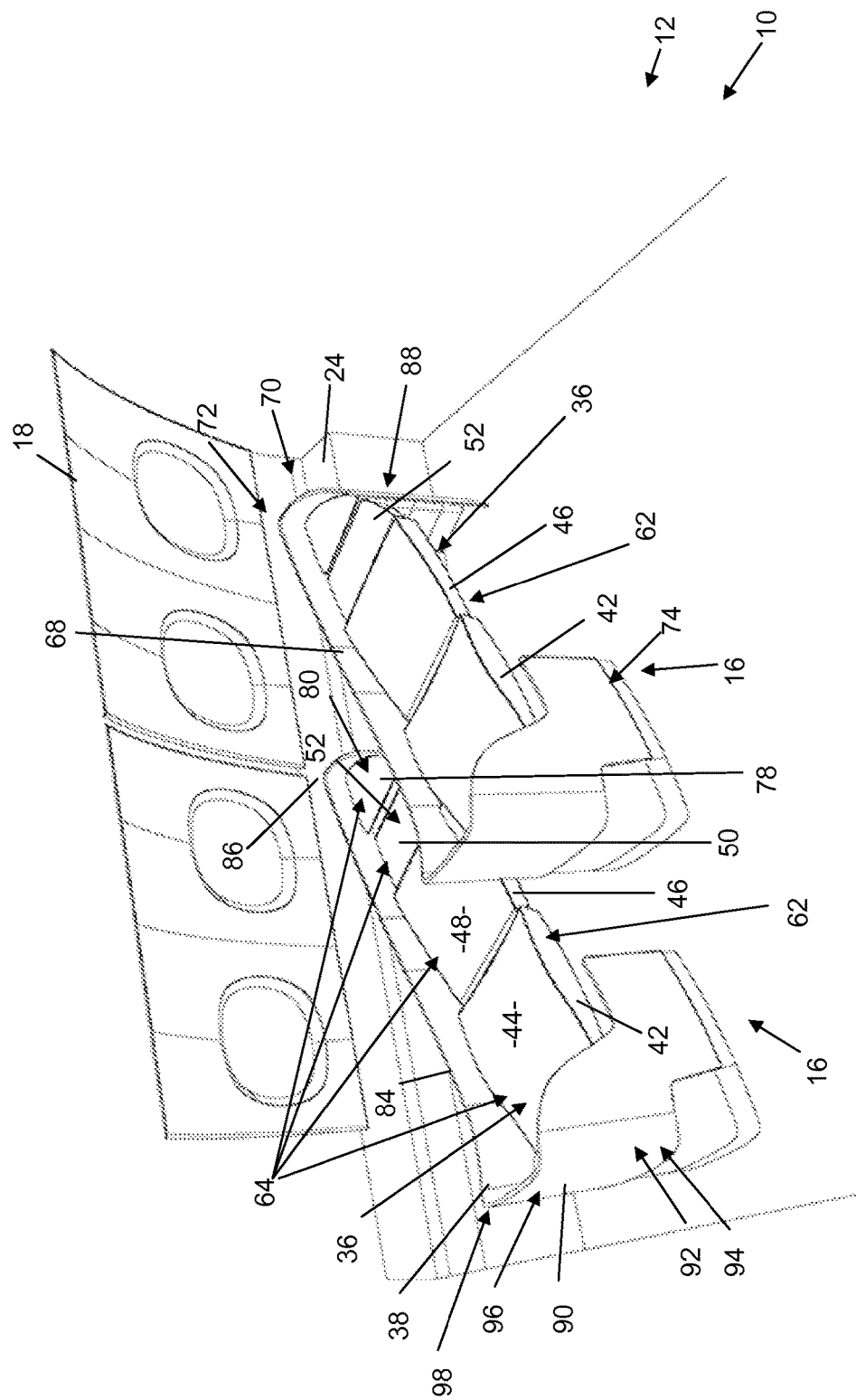

FIG. 3 a representation comparable to FIG. 1, where in this case the seat structures of the seat assemblies are in a reclining position.

Figure 4:
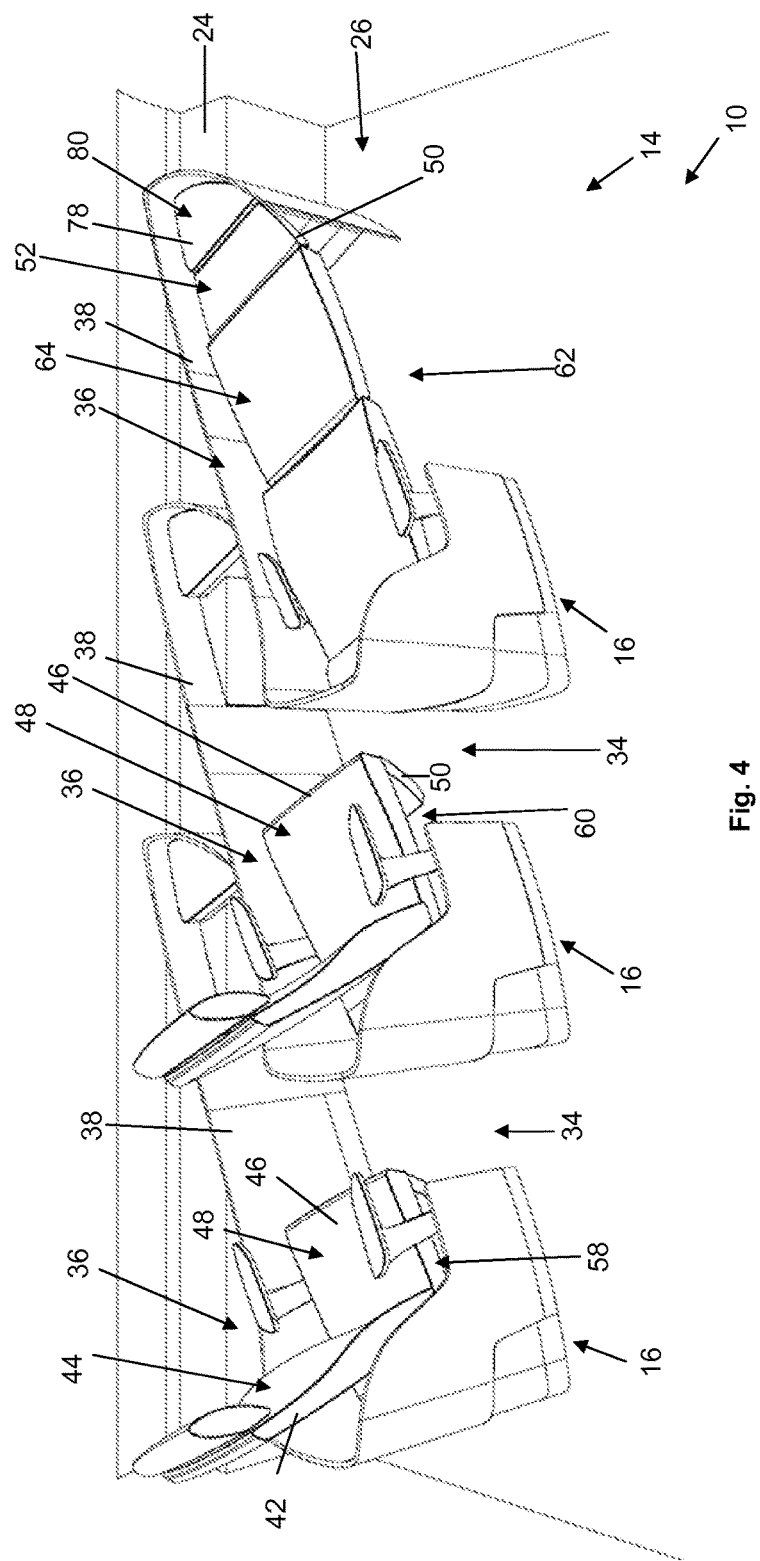

FIG. 4 a perspective representation of the seat arrangement from FIGS. 1 to 3, where in this case three adjacent seat assemblies are shown for comparison purposes; and a first seat assembly is in the access position, a second seat assembly is in the comfort position; and a third seat assembly is in the reclining position.

Figure 5:
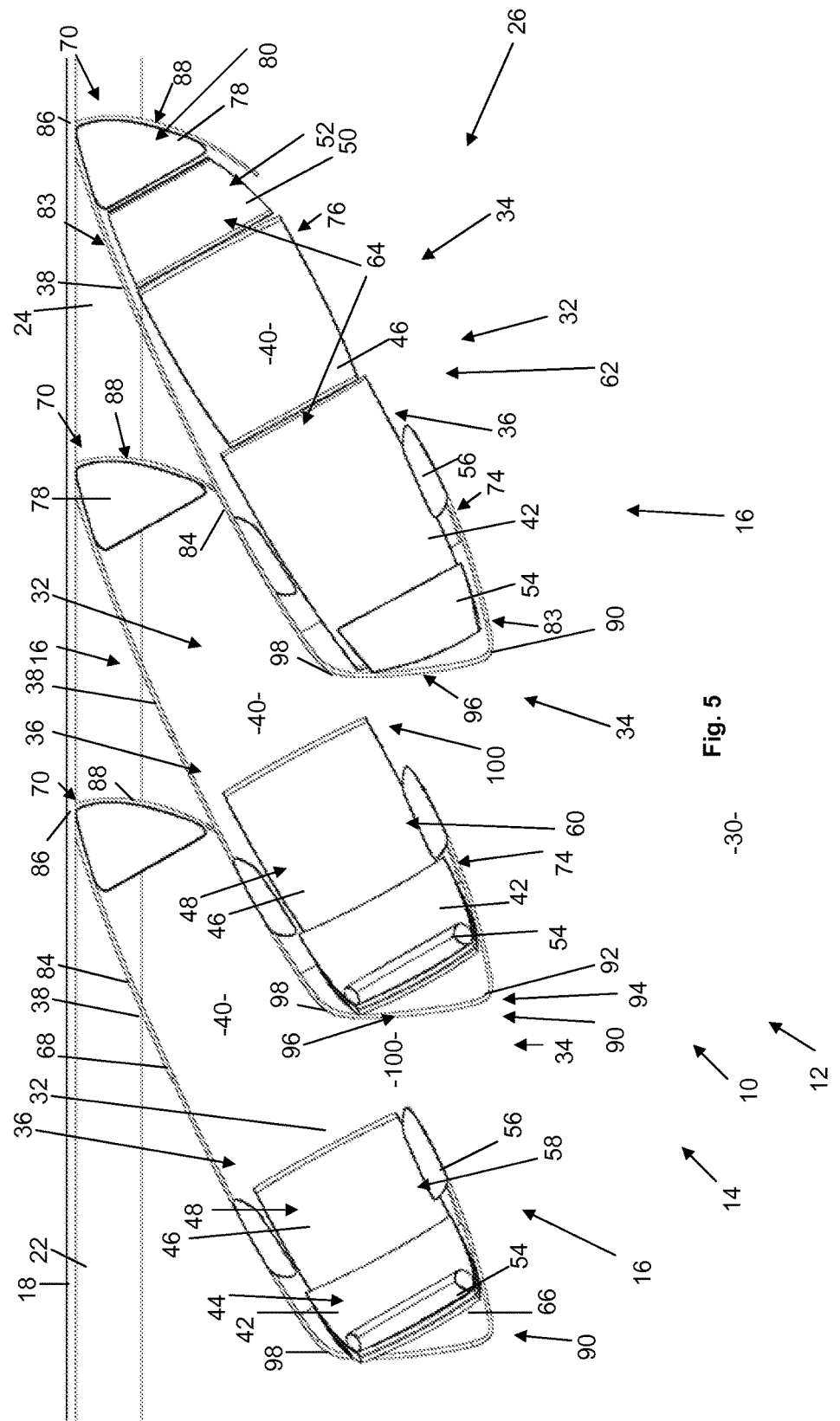

FIG. 5 a plan view of the seat arrangement (herringbone layout in all positions), which was shown in FIG. 4 in a perspective view.

Figure 6:
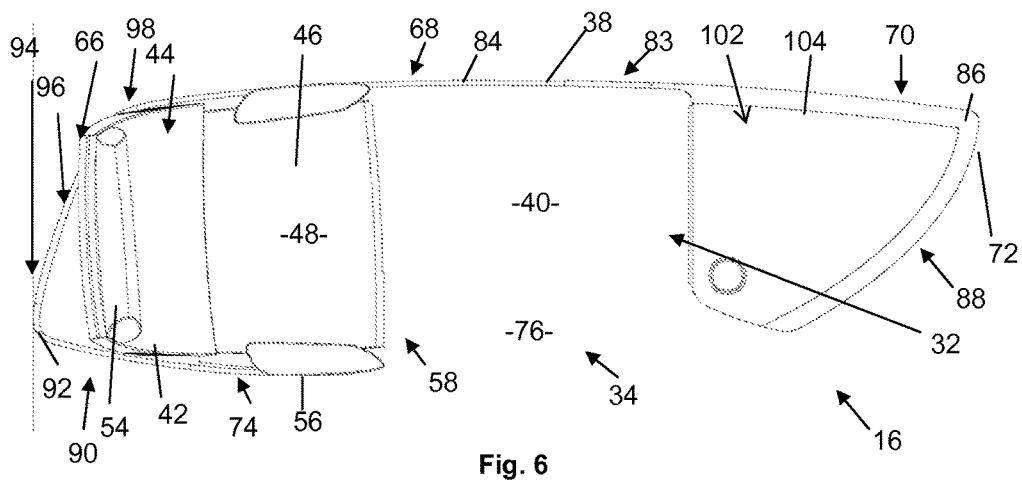

FIG. 6 a plan view of a single seat assembly for configuring comparable seat arrangements, as in FIGS. 1 to 5, where in this case a second embodiment of the seat assembly is shown in the access position.

Figure 7:
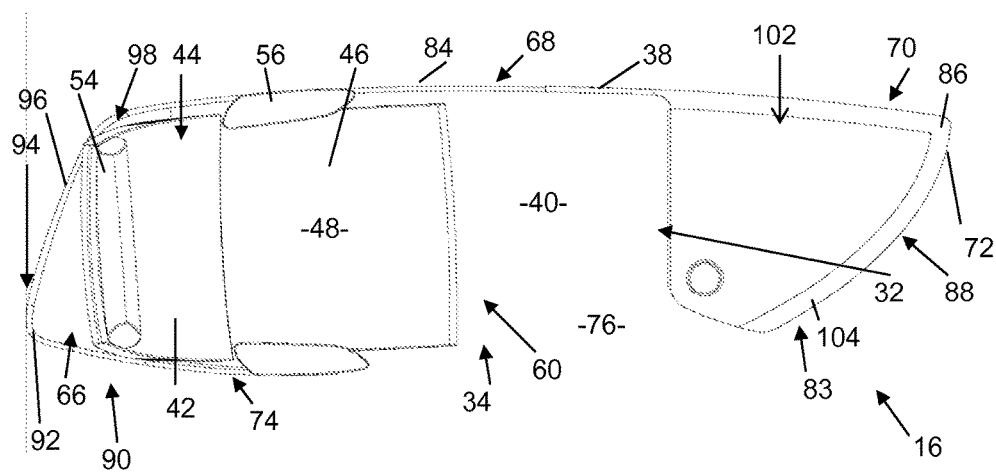

FIG. 7 a representation, as in FIG. 6, with the second embodiment of the seat assembly in the comfort position.

Figure 8:
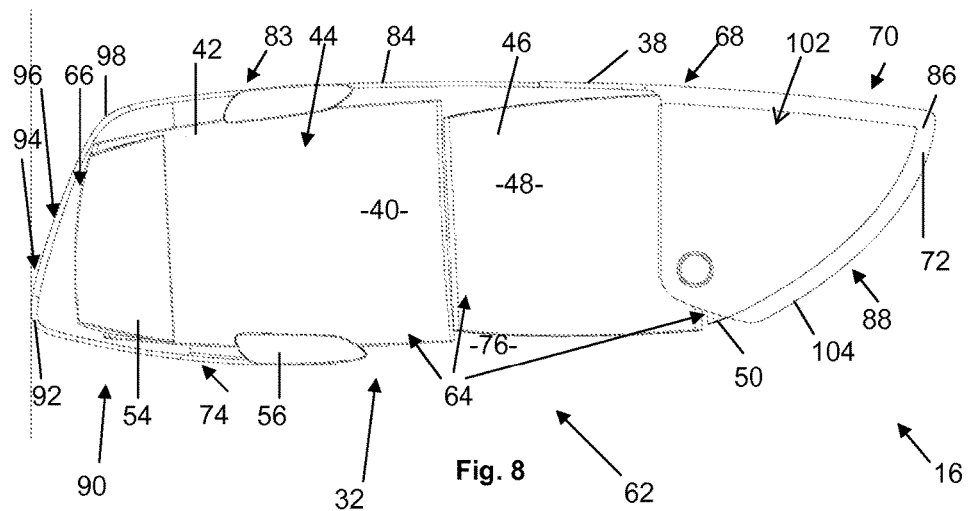

FIG. 8 a representation, as in FIG. 6, with the second embodiment of the seat assembly in the reclining position.

Figure 9:
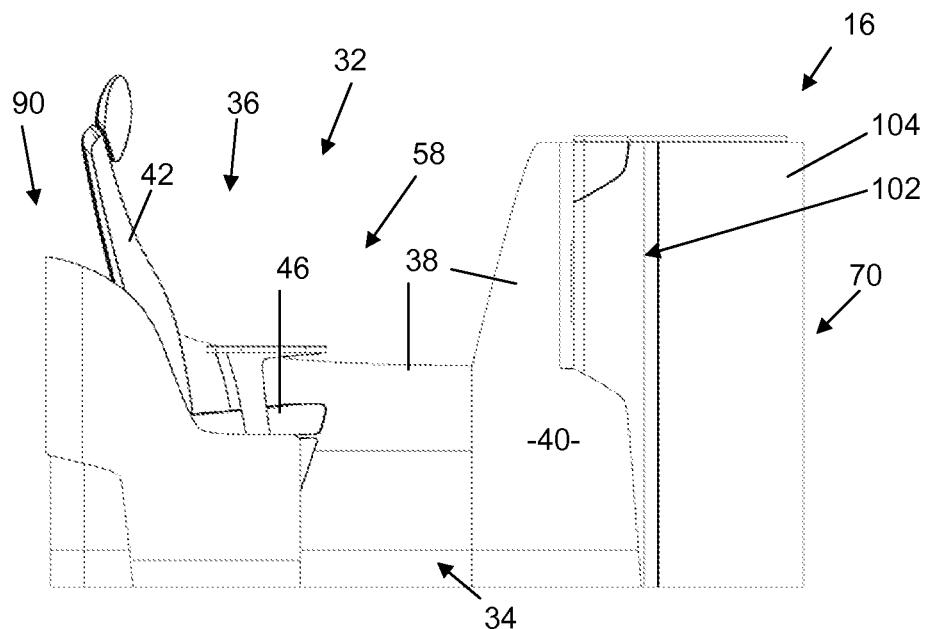

FIG. 9 a side view of the second embodiment of the seat assembly in the access position.

Figure 10:
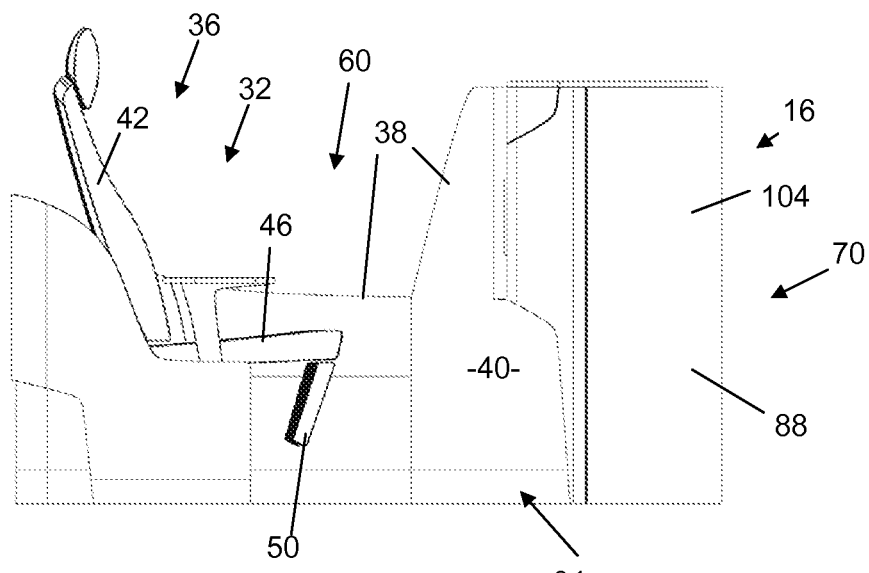

FIG. 10 a representation, as in FIG. 9, with the second embodiment of the seat assembly in the comfort position.

Figure 11:
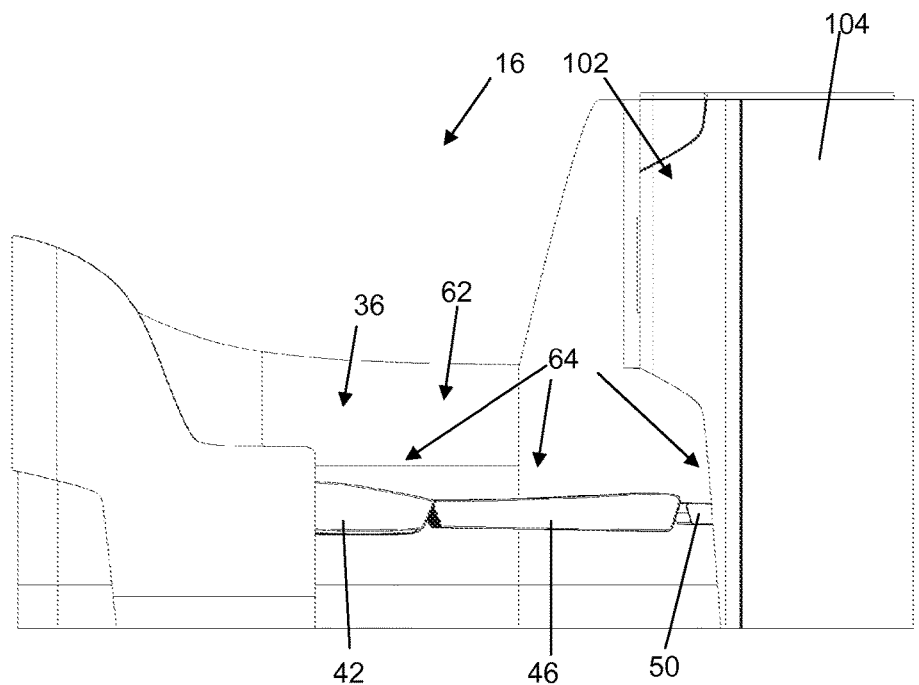

FIG. 11 a representation, as in FIG. 9, with the second embodiment of the seat assembly in the reclining position.

Figure 12:
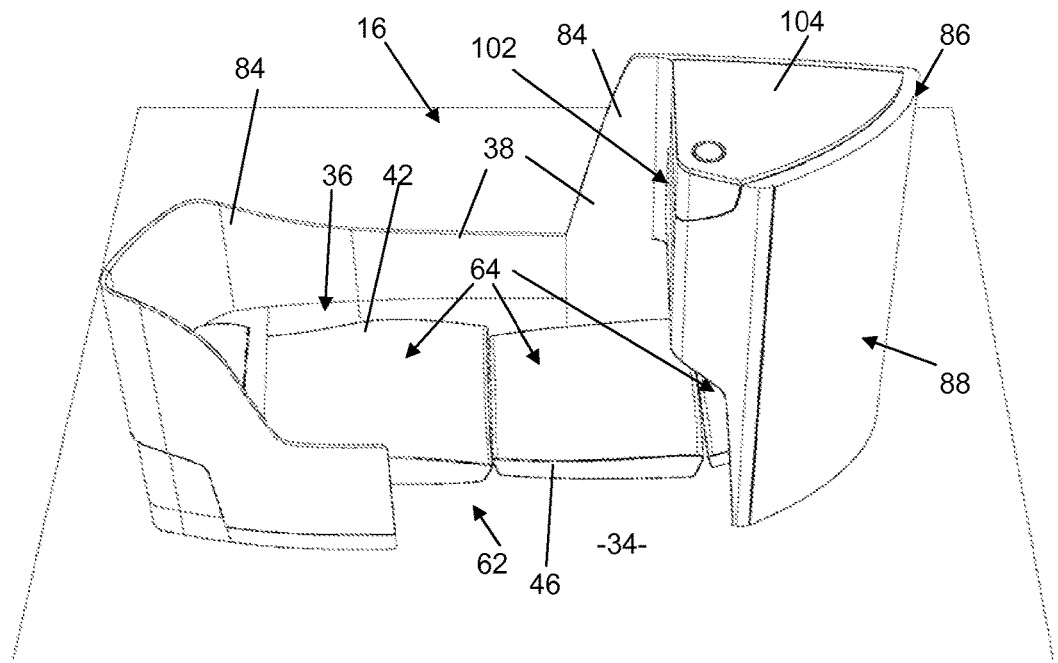

FIG. 12 a perspective view of the second embodiment of the seat assembly in the reclining position.

Figure 13:
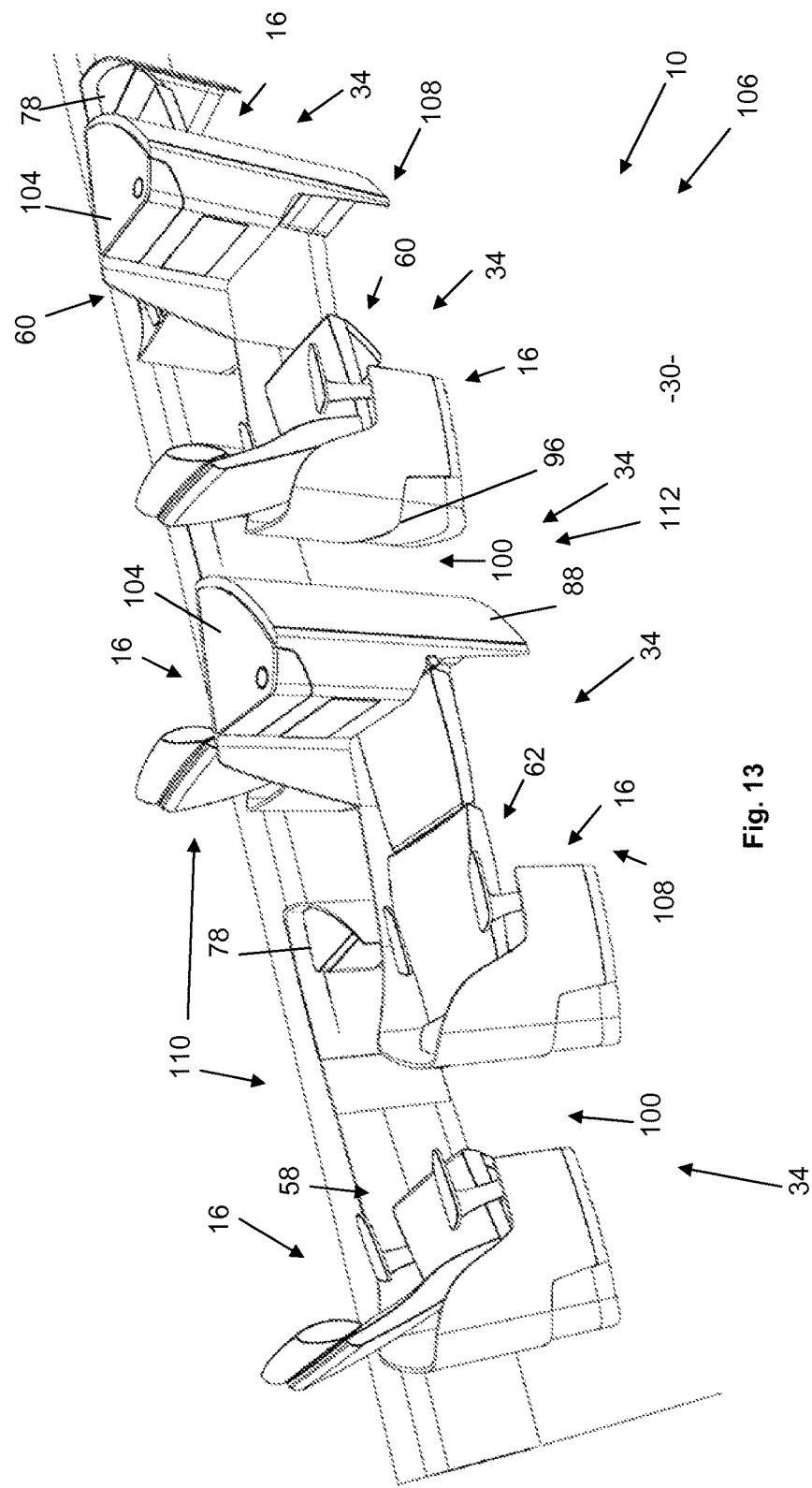

FIG. 13 a perspective view of a side wall region of another embodiment of a passenger cabin of an aircraft, such as, in particular, an airplane, with a second embodiment of a seat arrangement composed of a plurality of seat assemblies ("standard layout"), which are arranged in an offset manner side by side and one behind the other, in an access position, where in this case the seat assemblies of the first embodiment are put in an outer row (for example, the window row) and the seat assemblies of the second embodiment are put in an adjacent row (for example, the aisle row), which is arranged more towards the center, and are shown in all three different positions: the access position, the comfort position and the reclining position.

Figure 14:
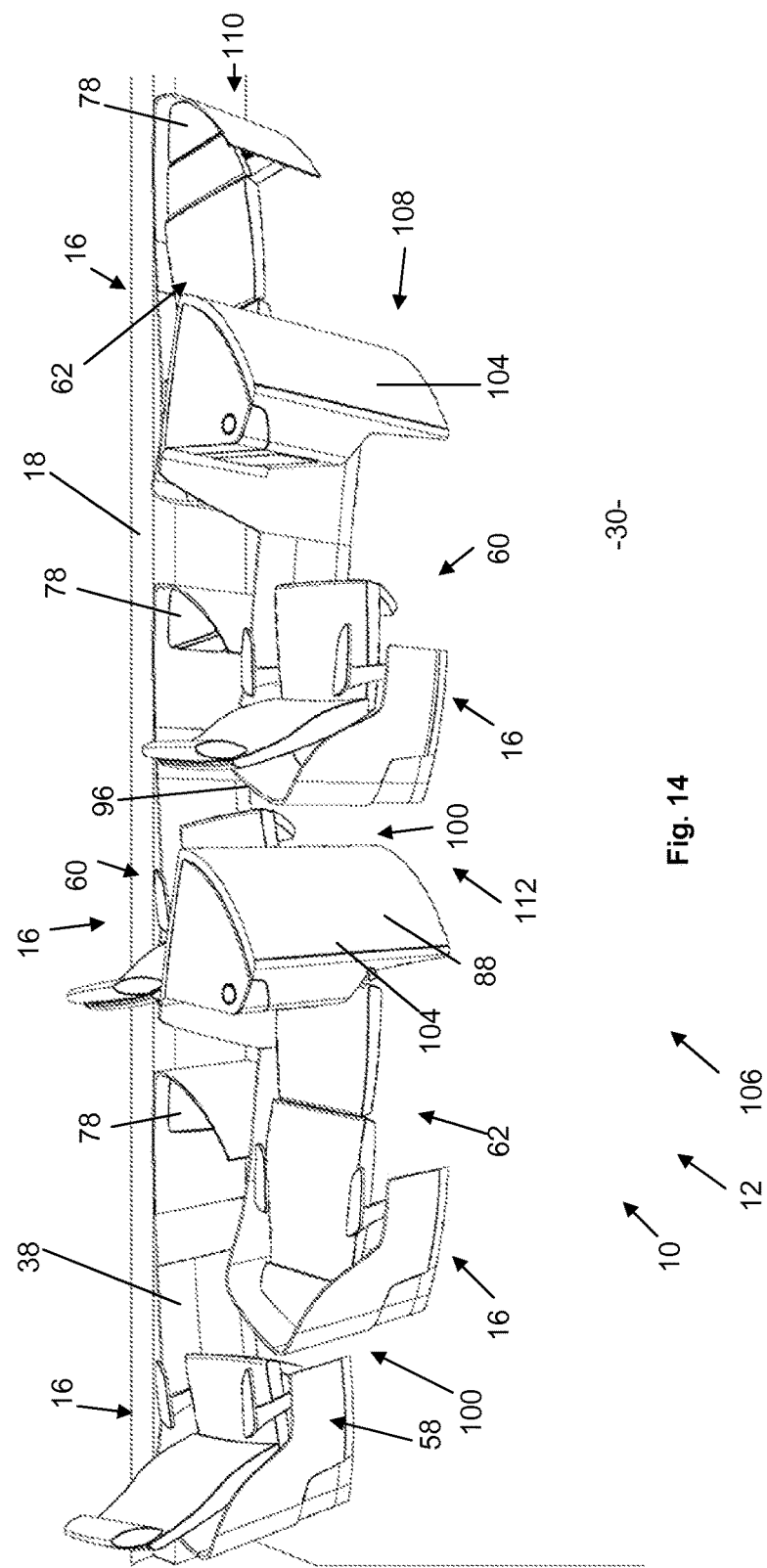

FIG. 14 a representation, as in FIG. 13, from a different perspective.

Figure 15:
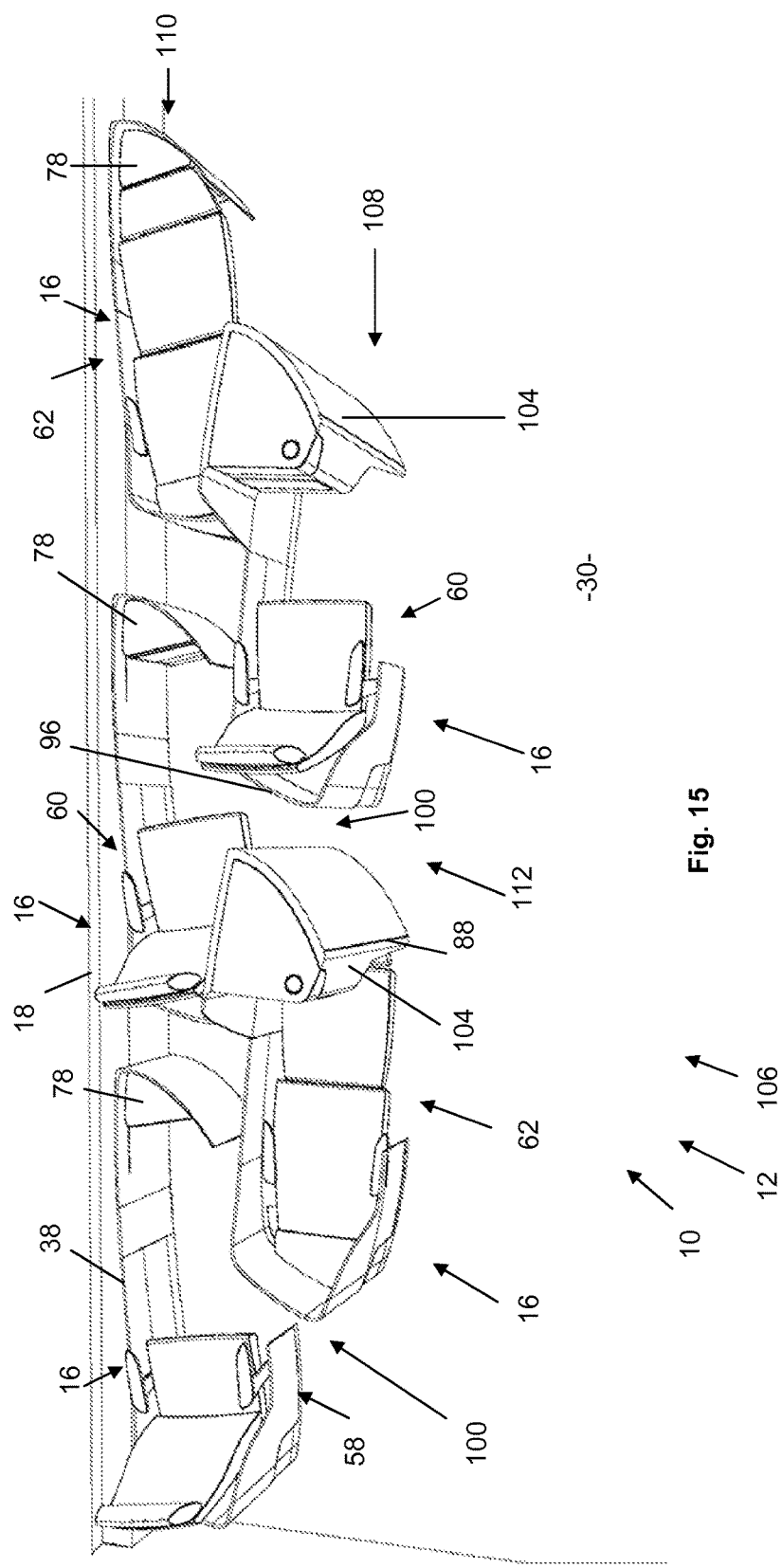

FIG. 15 a representation, as in FIG. 13, from yet another perspective.

Figure 16:
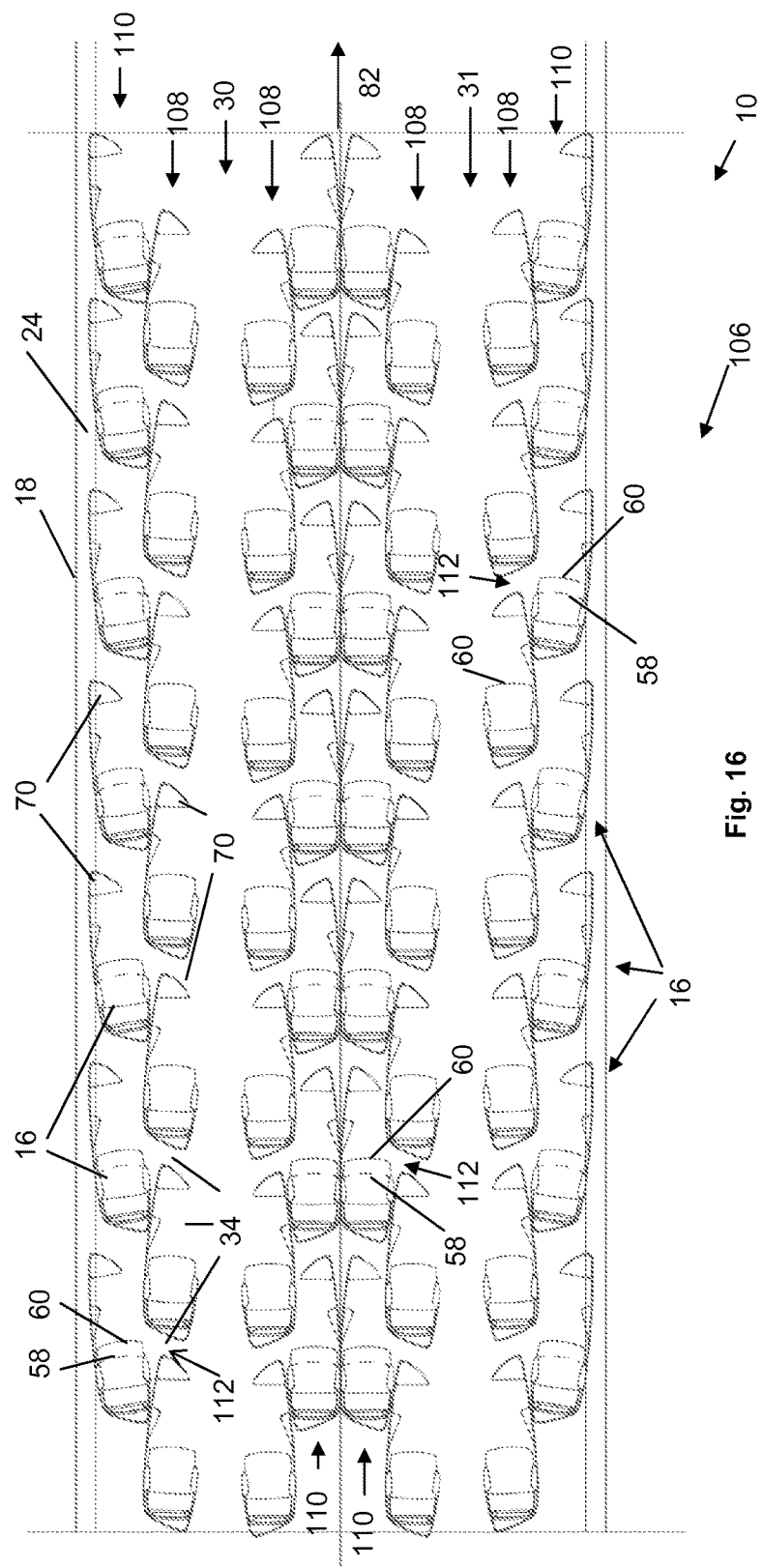

FIG. 16 a plan view of a region of the second embodiment of the passenger cabin with the second embodiment of the seat arrangement over the entire width of the passenger cabin; the seat assemblies in the comfort position are shown with a solid line; and the access position is shown with a dashed line.

Figure 17:
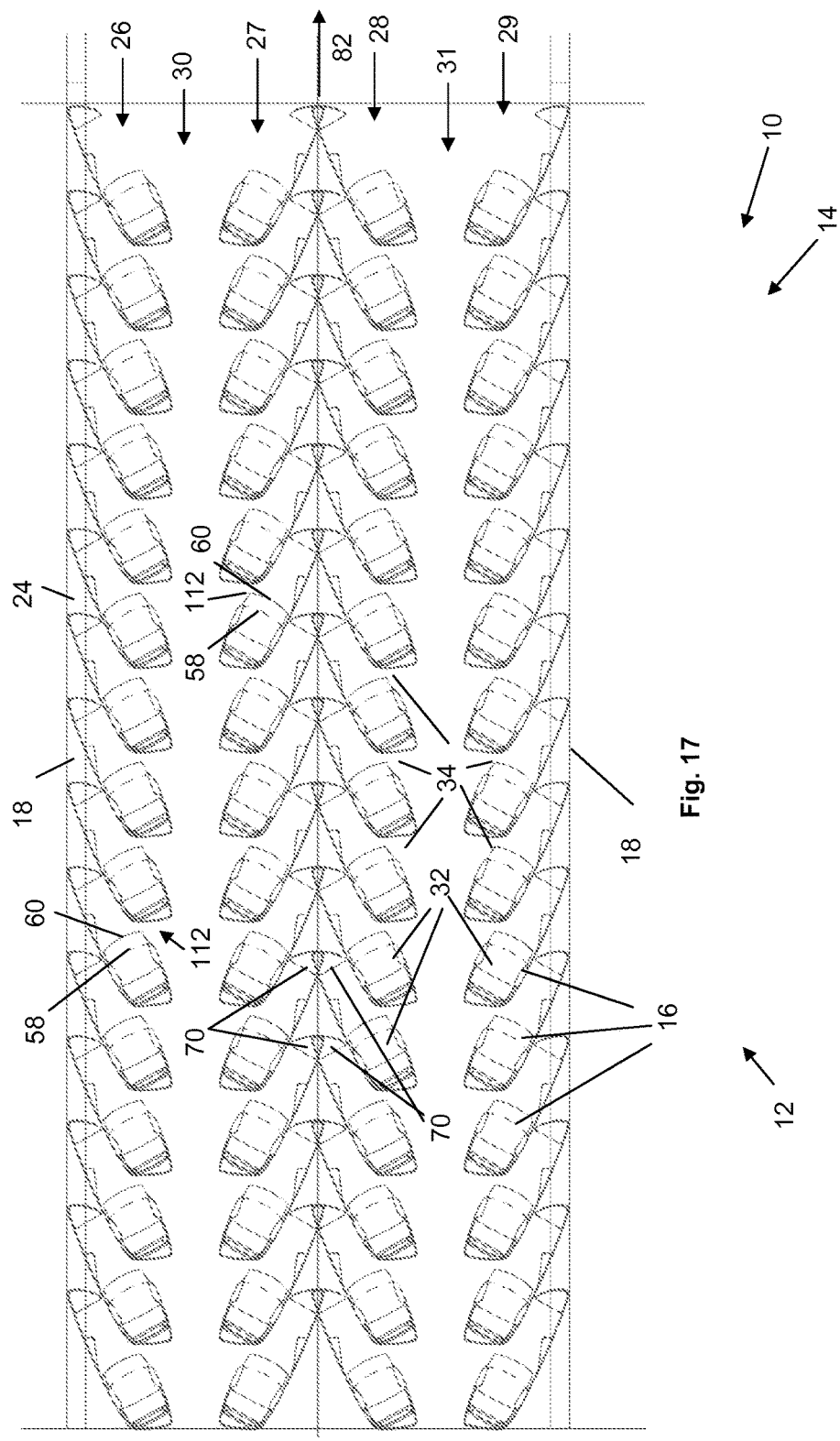

FIG. 17 a plan view of a region of the first embodiment of the passenger cabin with the first embodiment of the seat arrangement over the entire width of the passenger cabin; the seats in the comfort position are shown with a solid line; and the access position is shown with a dashed line.

Figure 18:
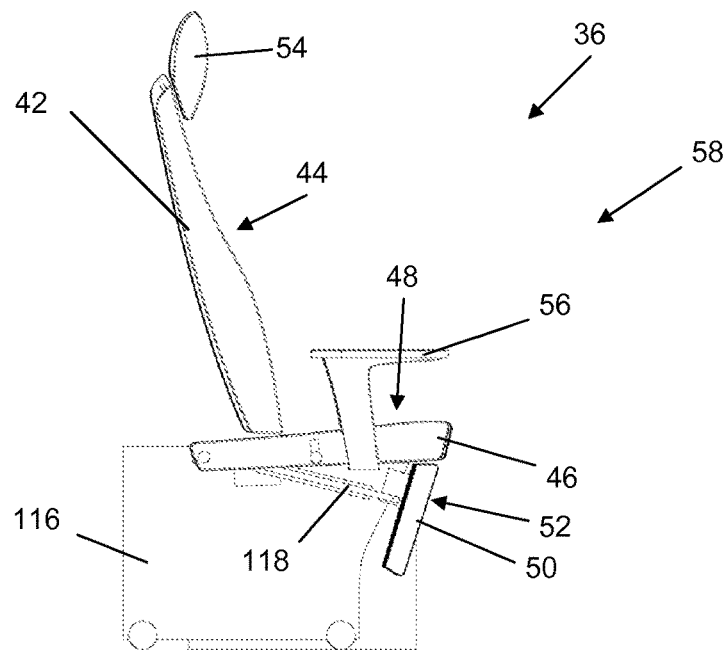

FIG. 18 a side view of a seat structure, which can be used in the first and the second embodiment of the seat assembly, in an access position.

Figure 19:
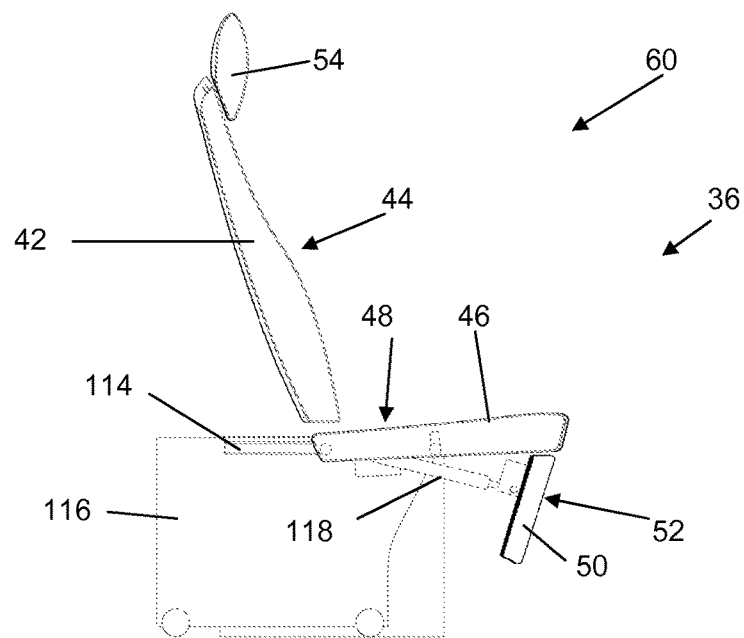

FIG. 19 a representation, as in FIG. 18, in the comfort position.

Figure 20:
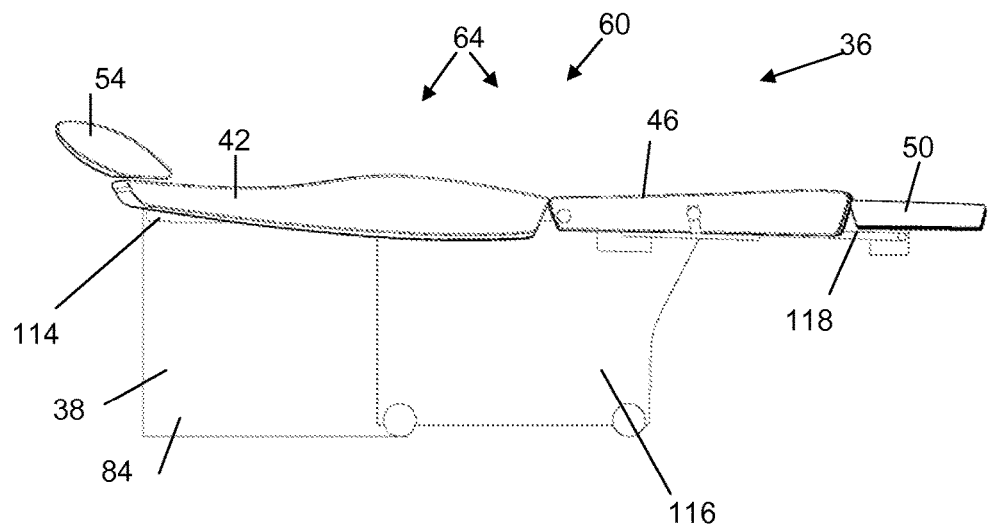

FIG. 20 a representation, as in FIG. 19, in the reclining position; and

Figure 21:
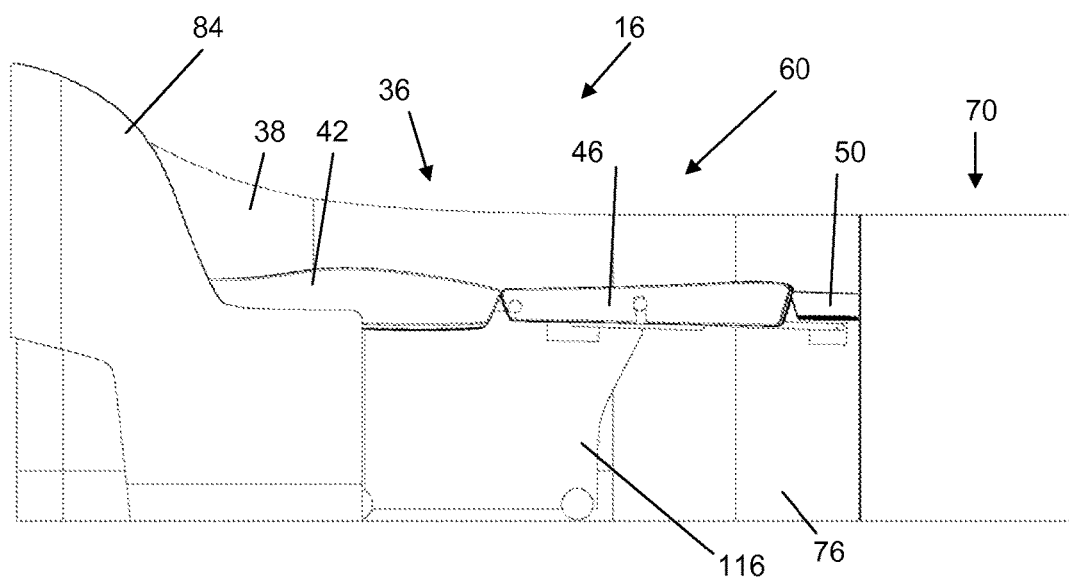

FIG. 21 a side view of a seat assembly, according to the first embodiment, with the seat structure shown, as in FIG. 20, in the reclining position.

DETAILED DESCRIPTION

FIGS. 1 to 5 and 17 show a first embodiment of a passenger cabin 10 of an aircraft, such as, in particular, an airplane 12, with a first embodiment of a seat arrangement 14, which is formed by the seat assemblies 16.

The passenger cabin 10 has curved side walls 18 (in this case with windows 20) and a side wall storage space 22, which is housed in a side wall storage space delimitation 24, which extends along the side wall 18 beneath the window 20.

In the example shown, the seat arrangement 14 has four seat rows, as shown, in particular, in FIG. 17, i.e., a left outer row 26 (window row), a left center row 27, a right center row 28, as well as a right outer row 29 (window row). Between the respective outer rows 26, 29 and the center rows 27, 28, an aisle 30, 31 is formed in each case.

Shown is a business class region of the passenger cabin 10 with business class seats that are intended for long distances. In order to form the individual seats 32, there are seat assemblies 16, which are formed in such a way that each seat 32 has its own access 34 from the closest aisle 30, 31.

The construction of the respective seat assemblies 16 is described in more detail below.

The seat assembly 16 has a seat structure 36, in order to form the actual seat 32, and a passenger space partition 38, in order to spatially separate the passenger space 40 for the personal use of the passenger using the respective seat 32.

The seat structure 36 comprises a seat backrest 42, on which is formed a backrest surface 44, and a seat cushion element 46 having an upper side that forms the seat surface 48.

In each of the embodiments shown, the seat structure 36 has, in addition, a leg support element 50, on which a leg support surface 52 is formed.

In the embodiments shown, a head support 54 is also mounted on the seat backrest 42; furthermore, armrests 56 are provided.

The seat structure 36 can be adjusted in at least three positions: i.e., an access position 58, a comfort position 60, and a reclining position 62.

In order to move from the comfort position 60 into the access position 48, the seat cushion element 46 is moved with its rearward portion under the seat backrest 42. As a result, the useable seat surface 48 is variable. In the comfort position 60 a seat surface 48 that is lower than in the access position 58 by approximately 3 inches to 10 inches is provided.

FIGS. 16 and 17 show the seat structures 36 in the comfort position 60, whereas the access position 58 is shown with a dashed line. As can be seen, the access position 58 makes easy access possible, even if the access path 112 is narrow and is limited by the adjacent seat structures 36.

In the following reference is made once again to the FIGS. 1 to 15 and 17, in order to explain in more detail the construction and the function of the seat assemblies.

In the reclining position 62 the seat cushion element 46 is pushed even further forwards; the leg support 50 is swung up; and the seat backrest 42 is swung down into the space, which is made available by pushing away the seat cushion element 46, underneath the seat backrest 42, which is located in the access position 58, so that a flat sleeping surface 64 having a diagonally measured length of approximately 195 cm is formed inside the passenger space 40, which is separated from the passenger space partition 38.

The passenger space partition 38 completely surrounds the seat structure 36 on its back side 66 as well as on a side region 68 and on a frontal front end 72, which forms a foot region 70 in the reclining position, and leaves open a wide access 76 on the other side region 74.

As can be seen, in particular, in FIGS. 1 to 5, the front end 72 of the seat assemblies 16 in the outer rows 26, 29 overlaps the side wall storage space 22, where in this case a foot support element 78, which rests on the side wall storage space delimitation 24, is provided with a foot support surface 80. When the seat structure 36 has been moved into the reclining position 62, a region of the side wall storage space delimitation 24, which projects into the outer contour of the passenger space partition 38, is used as the underlay for the leg support element 50.

As can be seen, in particular, from FIG. 17, the seat assemblies 16 in the outer rows 26, 29 are arranged so as to be tilted with their front end 72 towards the side walls 18 relative to the longitudinal direction 82 (=direction of flight) of the passenger cabin 10, in order to form an angle of 10 deg. to 40 deg., in particular, approximately 28.4 deg.

The outer contour 83 (which can be seen in FIGS. 5 to 8, 16 and 17) of the seat cover, which forms the passenger space partition 38, has more or less the form of a parallelogram, which resemble the shape of a tear.

The side region 68 without access (base line of the parallelogram shape) is formed, when seen in the plan view, more or less rectilinear and terminates at the front end 72 in a front projection 86, which is arranged so as to be offset towards the side without access relative to the longitudinal center plane by means of the seat assembly 16.

From this front projection 86 the seat cover 84 extends in its outer contour with a bevel or an arch-shaped shoulder 88 downwards to the wide access 76.

This measure allows the foot end region 70 to be designed narrower than a rear end region 90, which envelops the seat structure 36 in the access position 58 and the comfort position 60.

At the rear end region 90 the seat cover 84 extends then from the wide access 76, which extends up to the armrests 56, towards a bevel or taper more or less downwards as far as to a downwards pointing projection, which forms the rearward end 94 of the seat assembly 16. This projection 92 is also arranged so as to be offset towards the side relative to the longitudinal center plane by means of the seat assembly 16, but towards the side region 74 with access. From the rear projection 92 the seat cover 84 extends around the seat backrest 62 (in the access position 58 or the comfort position 60) with a bevel 96, which is tilted forwards and towards the side region 68 without access, or with a shoulder, which at a corner region terminates in turn in the side region 68, which has no access and extends more or less in the frontal direction.

As can be seen from FIGS. 1 to 5 and 17, each of the front seat assemblies extends with this corner region 98 and with the rearward region of the side region 68 without access into the wide access 76 of the side region 74 of the respective adjacent rear seat assembly 16. In this case the wider access 76 of the respective seat assembly 16 is restricted by the front seat assembly 16 to a narrow access 100, which is defined by the rearward end of the wider access 76, on the one hand, and the rear bevel 96 of the respective front seat assembly 16.

In the case of the seat structure 36, which is in the access position 48, the full width of this narrower access 100 can be used, because the seat cushion element 46 is moved out of the way of the narrower access 100 (see, for example, FIG. 1). If the seat structure 36 is in the comfort position 60, then the seat cushion element 46 projects far into the narrow access 100. The narrow access 100 can also be completely blocked by the seat cushion element 46, which is in the comfort position, because a passenger can adjust the seat structure 36 into the access position 58, in order to enter into the passenger space 40 and in order to leave the passenger space.

FIGS. 6 to 12 show, in addition, a second embodiment of the seat assembly, which corresponds, except for the embodiment of the foot end region 70, to the first embodiment explained above.

As shown in FIGS. 6 to 12, a personal storage space 102 is formed in the foot end region inside the seat cover 34. A foot support element 78 with the foot support surface 80 is located under a storage space delimitation 104, which is formed in the foot end region 70. Otherwise, the second embodiment of the seat structure corresponds to the first embodiment of the seat structure 16 that was explained above.

FIGS. 13 to 16 show a second embodiment of a seat arrangement 106, wherein in the embodiment shown in FIG. 16 a total of eight rows of seat assemblies 16 are arranged side by side. In the adjacent seat rows the individual seat assemblies are arranged so as to be offset from each other in the longitudinal direction.

Here, too, the two aisles 30, 31 are formed. A seat row 108, which is formed close to the aisle, is provided in each case next to the aisles 30, 31; and a seat row 110, which is formed away from the aisle, is provided further away from the respective aisle 30, 31. The seat row 110, which is formed away from the aisle, can be, for example, an outer row or a window row. One or two center rows can also be provided in the center region.

In the embodiment of the seat arrangement 106 that is shown, the seat assemblies 16 of the seat rows 110, which are formed away from the aisle, are formed, according to the first embodiment, whereas the seat assemblies 16 in the seat rows 108, which are formed close to the aisle, are formed, according to the second embodiment, as shown, for example, in FIG. 12.

As can be seen the best in FIG. 16, the seat assemblies 16 of the window rows are arranged tilted at about 5 deg. to 10 deg. with the foot end region 70 towards the respective side wall 18. The seat assemblies 16, which are located between the side wall 18 and the respective aisle 30, 31, in the seat rows 108, which are formed close to the aisle, are tilted with their rearward ends 94 towards the respective wide access 76 of the adjacent seat assembly 16 at a smaller angle, for example 2 deg. to 5 deg. relative to the longitudinal direction 82 of the passenger cabin 10 (corresponds to the direction of flight). The seat assemblies 16 of at least the seat row 108, which is formed close to the aisle, are arranged one behind the other in such a way that between the back side of the respective front seat assembly and the front side of the respective rear seat assembly an access path 112 is formed to the respective adjacent seat of the seat row 110, which is formed away from the aisle. This access path 112 is defined by the rear bevel 96 of the front seat assembly 16 and the front shoulder 88 of the rear seat assembly 16.

In this case, too, the access path 112 for the passenger is cleared of obstructions by moving the seat cushion element 46 out of the comfort position 60 into the access position 46.

The seat arrangements 14, 106 allow better utilization of the space in the passenger cabin 10, so that, on the whole, more business class seats 32 can be obtained without loss of comfort for the respective passengers.

In the case of the tilted arrangements of the seat assemblies 60 that are shown, it can be provided that the seat structures 36 inside the passenger space 40, for example, for takeoff and landing, can be aligned so as to face in the direction of flight, i.e., in the longitudinal direction 82. This applies, in particular, to the seat structures 36, which are moved into the access position 58.

One possible mechanism for adjusting the seat structure 36 is explained below with reference to FIGS. 18 to 21.

As can be seen from FIGS. 18 to 21, the seat cushion element 46 can be hinged in a moveable manner in a longitudinal rail 114, in order to move between the access position 58 and the comfort position 60. The longitudinal rail 114 can be housed in the seat cover 84 of the passenger space partition 38.

In addition, a roller carriage 116 can be arranged in such a way that it can be moved towards the front and the rear. In the course of moving the seat structure 36 from the comfort position 60 into the reclining position 62, the roller carriage can be moved forwards, in order to support the seat backrest 42 and/or the seat cushion element 46 and/or the leg support element 50 in the reclining position 62.

Other mechanisms, instead of a roller carriage 160, are also conceivable.

It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

LIST OF REFERENCE NUMERALS 10 passenger cabin
12 airplane
14 seat arrangement (herringbone layout)
16 seat assembly
18 side wall
20 window
22 side wall storage space
24 side wall storage space delimitation
26 left outer row
27 left center row
28 right center row
29 right outer row
30 left aisle
31 right aisle
32 seat
34 access
36 seat structure
38 passenger space partition
40 passenger space
42 seat backrest
44 backrest surface
46 seat cushion element
48 seat surface
50 leg support element
52 leg support surface
54 head support
56 armrest
58 access position
60 comfort position
62 reclining position
64 sleeping surface
66 back side
68 side region (without access)
70 foot end region
72 front end
74 side region (with access)
76 wide access
78 foot support element
80 foot support surface
82 longitudinal direction
84 seat cover
86 front projection
88 shoulder
90 rear end region
92 rear projection
94 rearward end
96 rear bevel
98 corner region
100 narrow access
102 storage space
104 storage space delimitation (foot end region)
106 seat arrangement (standard layout)
108 seat row formed close to the aisle (aisle row)
110 seat row formed away from the aisle (for example, the window row or center row)
112 access path
114 longitudinal rail
116 roller carriage

What is claimed is:

1. A seat assembly for forming at least one seat of a seat arrangement for a passenger cabin of an aircraft, the seat assembly comprising:
    at least one seat structure, which has
        a seat backrest forming a backrest surface,
        a seat cushion element for forming a seat surface, and
        a passenger space partition, which is arranged to spatially partition a passenger space of the seat and which at least partially surrounds the seat structure and leaves open an access to the seat structure,
    wherein the seat cushion element is moveable between
        a comfort position in which the seat cushion element projects further into the access to provide a larger seat surface, and
        an access position in which the seat cushion element does not project as far or does not project at all into the access to provide a wider access,
        wherein the seat cushion element is configured to be moveable relative to the seat backrest in such a way that in the access position at least a portion of the seat surface extends horizontally under and beyond the backrest so that the seat surface has a variable depth between the access and comfort positions,
        wherein the seat cushion element is moveable, when seen or projected in the horizontal direction, between the comfort position and the access position by 7 cm to 26 cm to provide a seat surface that is 7 cm to 26 cm lower in the comfort position than in the access position.

2. The seat assembly of claim 1, wherein:
    the seat structure has a foot or leg support element, which has a foot or leg rest surface and which is moveable between a position of use and an access position;
    the foot or leg support element is foldable relative to the seat cushion element in such a way that the foot or leg rest surface forms an elongation of the seat surface in the position of use or the reclining position;
    the seat backrest is moveable between an upright position and the reclining position;
    in the reclining position the backrest surface and the seat surface together form at least one portion of an essentially horizontal sleeping surface, when the seat structure is in the reclining position;
    in the reclining position the seat backrest extends into a space occupied by the seat cushion element in the access position;
    the seat structure is moveable into the reclining position, in which the backrest surface, the seat surface, and a foot or leg rest surface, which is formed at a foot or leg support element, form a flat or planar sleeping surface;
    in the reclining position the foot or leg support element rests on a storage space delimitation;
    the passenger space partition has a storage space with the storage space delimitation, which in the reclining position supports a foot or leg support surface;
    in the reclining position the seat assembly provides a sleeping surface having a length of at least 180 cm to 200 cm in at least one direction;
    in the reclining position the seat assembly provides a sleeping surface having a length of 195 cm in at least one direction; or
    the passenger space partition has a cutout or a bulge that allows movement of the seat cushion element into the reclining position.

3. The seat assembly of claim 1, wherein:
    in a plan view the seat assembly has a tear-shaped outer contour with a narrower foot end region and a wider rear end region, which surrounds the seat structure in the access or comfort position;
    the seat assembly has an asymmetrical outer contour relative to a longitudinal center plane;
    in the plan view the passenger space partition has a front projection at the foot end region, the front projection forming the front end of the passenger space partition and is arranged so as to be offset towards one side relative to a longitudinal center plane;
    the front projection is arranged so as to be offset towards a side, having no access, relative to the longitudinal center plane;
    between the front end and the access the passenger space partition has, when seen in the plan view, a bevel or an arch-shaped shoulder;
    on the rear end region the passenger space partition has, when viewed in the plan view, a projection forming the rearward end of the passenger space partition and is arranged so as to be offset towards one side relative to a longitudinal center plane;
    the rearward end is arranged so as to be offset towards a side having an access;
    the passenger space partition has a forwards extending bevel or a forwards extending arch-like shoulder from the rearward end to the center and to a side having no access; or
    a storage compartment or storage container for providing a storage space, which can be used personally by the passenger using the seat assembly, is housed in the foot end region.

4. A seat arrangement for a passenger cabin of an aircraft, the seat arrangement comprising:
    a plurality of seat assemblies, each of which comprises
        at least one seat structure, which has
            a seat backrest forming a backrest surface,
            a seat cushion element for forming a seat surface, and
            a passenger space partition, which is arranged to spatially partition a passenger space of the seat and which at least partially surrounds the seat structure and leaves open an access to the seat structure,
        wherein the seat cushion element is moveable between
            a comfort position in which the seat cushion element projects further into the access to provide a larger seat surface, and
            an access position in which the seat cushion element does not project as far or does not project at all into the access to provide a wider access,
            wherein the seat cushion element is configured to be moveable relative to the seat backrest in such a way that in the access position at least a portion of the seat surface extends horizontally under and beyond the backrest so that the seat surface has a variable depth between the access and comfort positions,
            wherein the seat cushion element is moveable, when seen or projected in the horizontal direction, between the comfort position and the access position by 7 cm to 26 cm to provide a seat surface that is 7 cm to 26 cm lower in the comfort position than in the access position.

5. The seat arrangement of claim 4, wherein at least some of the plurality of seat assemblies have an access path to the access leading past a front end or a rearward end of a respective adjacent seat assembly or is defined by the front end or rearward end.

6. The seat arrangement of claim 4, wherein rows of laterally adjacent seat assemblies are arranged so as to be offset from each other in such a way that an access spacing distance, which opens out into the access of a laterally adjacent seat assembly, is formed between a front end of a seat assembly, following in a row, and a rearward end of a seat assembly, located in the row in front of the former row, to provide an access path from a longitudinal aisle to the seat of the laterally adjacent seat assembly.

7. The seat arrangement of claim 4, wherein a space is formed between at least two seat assemblies as the storage space.

8. The seat arrangement of claim 4, wherein:
the seat assemblies of lateral outer rows are arranged so as to be tilted with the foot end regions of the seat assemblies towards outside;
the seat assemblies of a first and a second adjacent center row are tilted in each case towards the other of the first and the second center row;
the foot end regions of the adjacent seat assemblies overlap, when seen in the plan view; or
at least one rear end region of a first seat assembly projects, when seen in the plan view, into an access of a passenger space partition of an adjacent second seat assembly so as to overlap the outer contour of the adjacent second seat assembly.

9. A passenger cabin of an aircraft, comprising:
a seat arrangement, which comprises a plurality of seat assemblies, each of which comprises
at least one seat structure, which has
a seat backrest forming a backrest surface,
a seat cushion element for forming a seat surface, and
a passenger space partition, which is arranged to spatially partition a passenger space of the seat and which at least partially surrounds the seat structure and leaves open an access to the seat structure,
wherein the seat cushion element is moveable between
a comfort position in which the seat cushion element projects further into the access to provide a larger seat surface, and
an access position in which the seat cushion element does not project as far or does not project at all into the access to provide a wider access,
wherein the seat cushion element is configured to be moveable relative to the seat backrest in such a way that in the access position at least a portion of the seat surface extends horizontally under and beyond the backrest so that the seat surface has a variable depth between the access and comfort positions,
wherein the seat cushion element is moveable, when seen or projected in the horizontal direction, between the comfort position and the access position by 7 cm to 26 cm to provide the seat surface that 7 cm to 26 cm lower in the comfort position than in the access position.

* * * * *